US007421740B2

(12) United States Patent
Fey et al.

(10) Patent No.: US 7,421,740 B2
(45) Date of Patent: Sep. 2, 2008

(54) MANAGING USER AUTHORIZATIONS FOR ANALYTICAL REPORTING BASED ON OPERATIONAL AUTHORIZATIONS

(75) Inventors: Harald Fey, Illingen-Huettigweller (DE); Marcus Dill, Wiesloch (DE); Jens Buhr, Gersheim (DE)

(73) Assignee: SAP AG, Walldorf (DE)

( * ) Notice: Subject to any disclaimer, the term of this patent is extended or adjusted under 35 U.S.C. 154(b) by 742 days.

(21) Appl. No.: 10/864,595

(22) Filed: Jun. 10, 2004

(65) Prior Publication Data
US 2005/0278334 A1    Dec. 15, 2005

(51) Int. Cl.
G06F 7/04 (2006.01)
(52) U.S. Cl. .......................... 726/28; 726/27; 713/153; 713/185; 705/67; 705/76
(58) Field of Classification Search ................. 713/153, 713/185; 705/67, 76; 726/17, 28
See application file for complete search history.

(56) References Cited

U.S. PATENT DOCUMENTS

| | | | | |
|---|---|---|---|---|
| 6,014,666 A * | 1/2000 | Helland et al. | ................. | 707/9 |
| 6,470,339 B1 | 10/2002 | Karp et al. | ...................... | 707/8 |
| 6,470,353 B1 | 10/2002 | Yaung et al. | ................ | 707/103 |
| 6,484,258 B1 | 11/2002 | Haverty | ...................... | 713/155 |
| 6,499,036 B1 * | 12/2002 | Gurevich | ................ | 707/103 R |
| 6,513,039 B1 | 1/2003 | Kraenzel | ........................ | 707/9 |
| 6,535,879 B1 | 3/2003 | Behera | .......................... | 707/9 |
| 6,539,380 B1 | 3/2003 | Moran | ............................ | 707/9 |
| 6,578,037 B1 | 6/2003 | Wong et al. | .................... | 707/10 |
| 6,591,265 B1 | 7/2003 | Erickson et al. | ................. | 707/9 |

OTHER PUBLICATIONS

"XACML: A New Standard Protects Content in Data Exchange," Jun. 24, 2003, 7 pages, reprinted from http://developer.java.sun.com/developer/technicalArticles/Security/xacml/xacml.html.
"Sun's XACML Implementation," Jun. 23, 2003 Update, 2 pages, reprinted from http://sunxacml.sourceforge.net.
"Oasis: XACML Implementers Guide," Hal Lockhart, ed., Jun. 12, 2002, 5 pages.
"Oasis: Web-Services Policy Language Use-Cases and Requirements, Working Draft 04," Tim Moses, ed., Apr. 16, 2003, 23 pages.
"Oasis: eXtensible Access Control Markup Language (XACML) Version 1.0, Oasis Standard," Simon Godik and Tim Moses, eds., Feb. 18, 2003, 132 pages.

* cited by examiner

*Primary Examiner*—Emmanuel L Moise
*Assistant Examiner*—Paul Callahan
(74) *Attorney, Agent, or Firm*—Fish & Richardson P.C.

(57) ABSTRACT

Transactional access control information extracted from a transactional data source and used by a transactional application program is received at an analytical application program used for analytical processing. Each entry in the transactional access control information identifies a user that is permitted to access a data object that is stored in the transactional data source. The received transactional access control information is translated into analytical access control information for use by the analytical application program. Entries in the analytical access control information identify users that are able to access data objects that are stored in an analytical data store used by the analytical application program and correspond to data objects stored in the transactional data source.

18 Claims, 6 Drawing Sheets

500B

| ACCESS CONTROL IDENTIFIER | USER IDENTIFIER | BUSINESS OBJECT IDENTIFIER | PERMITTED ACTION | ACCESS CONTROL RULE IDENTIFIER | |
|---|---|---|---|---|---|
| AC1 | User A | Sale A | Read, Write | Rule01 | ← 560A |
| AC2 | User B | Sale A | Read, Write | Rule01 | ← 560B |
| AC3 | User A | Sale B | Read, Write | Rule01 | ← 560C |
| AC4 | User B | Sale B | Read, Write | Rule01 | ← 560D |
| AC5 | User A | Sale C | Read, Write | Rule01 | ← 560E |
| AC6 | User B | Sale C | Read, Write | Rule01 | ← 560F |
| AC7 | User C | Sale D | Read | Rule02 | ← 560G |

561 → ACCESS CONTROL IDENTIFIER; 563 → USER IDENTIFIER; 565 → BUSINESS OBJECT IDENTIFIER; 567 → PERMITTED ACTION; 569 → ACCESS CONTROL RULE IDENTIFIER

| PROFILE IDENTIFIER | USER IDENTIFIER | BUSINESS OBJECT IDENTIFIER | PERMITTED ACTION | |
|---|---|---|---|---|
| AC1 | User A | Sale A | Read, Write | ← 580A |
| AC2 | User B | Sale A | Read, Write | ← 580B |
| AC3 | User A | Sale B | Read, Write | ← 580C |
| AC4 | User B | Sale B | Read, Write | ← 580D |
| AC5 | User A | Sale C | Read, Write | ← 580E |
| AC6 | User B | Sale C | Read, Write | ← 580F |
| AC7 | User C | Sale D | Read | ← 580G |

581 → PROFILE IDENTIFIER; 583 → USER IDENTIFIER; 585 → BUSINESS OBJECT IDENTIFIER; 587 → PERMITTED ACTION

Figure 5B

MANAGING USER AUTHORIZATIONS FOR ANALYTICAL REPORTING BASED ON OPERATIONAL AUTHORIZATIONS

TECHNICAL FIELD

This description relates to managing information used to control access to data in a computer system.

BACKGROUND

Computer systems often are used to manage and process business data. To do so, a business enterprise may use various applications running on one or more computer systems. Application programs may be used to process business transactions, such as taking and fulfilling customer orders, providing supply chain and inventory management, performing human resource management functions, and performing financial management functions. Application programs also may be used for analyzing data, including analyzing data obtained through transaction processing systems. A business enterprise often may have a large volume of data and a large number of users who access data to process business transactions or to analyze data.

It may not be desirable for all users of a computer system to have access to all data in the computer system. This may be particularly true when a computer system has a large volume of data or is accessible to users or other computer systems over a private or public network.

One approach to preventing access to some portions of data by some users while permitting access to the portions of data by other users is to assign particular users access privileges to particular portions of the data. Creating and updating access control information so that the access control information accurately provides access to the appropriate portions of data to the appropriate users may be a complex process. For example, when the appropriate portions of the data are distributed across multiple computer systems, the access control information may be specified on each of the multiple computer systems, such that consistency must be maintained between the access control information specified on different computer systems and the access control information must be properly formatted for each of the different computer systems.

SUMMARY

In one general aspect, managing user access control information includes receiving, at an analytical application program used for analytical processing, transactional access control information extracted from a transactional data source and used by a transactional application program. Each entry in the transactional access control information identifies a user that is permitted to access a data object that is stored in the transactional data source. The received transactional access control information is translated into analytical access control information for use by the analytical application program: Entries in the analytical access control information identify users that are able to access data objects that i) are stored in an analytical data store used by the analytical application program and ii) correspond to data objects stored in the transactional data source.

Implementations may include one or more of the following features. For example, whether a data object stored in the transactional data source has a corresponding data object stored in the analytical data store may be determined. This may be done, for example, by determining whether an identifier of a data object in the data source corresponds to an identifier of a data object in the analytical data source. When transactional access control information may be extracted from the transactional data source, transactional access control information may be extracted only for data objects stored in the transactional data source that have corresponding data objects stored in the analytical data store. The extracted transactional access control information may be provided to the analytical application program.

Transactional access control information may be extracted from the transactional data source. Transactional access control information may be extracted only for users authorized to use both the transactional application program and the analytical application program. The extracted transactional access control information may be provided to the analytical application program.

An indication that the transactional access control information has changed may be received, and the transactional access control information that has changed may be identified. Only the changed transactional access control information may be received at the analytical application program for translation into analytical access control information.

The analytical access control information may be used to permit or restrict access to data objects that are stored in an analytical data store used by the analytical application program. Using the analytical access control information may include accessing a record from the analytical access control information. Whether an identifier of a user requesting access to the data objects matches a user identifier indicated in the accessed record from the analytical access control information may be determined along with whether an identifier of the data objects to which the user has requested access matches a data object identifier indicated in the accessed piece of analytical access control information. The user may be enabled to access the data objects in a manner indicated in the accessed piece of analytical control information when the identifier of the user matches the user identifier indicated in the accessed piece of analytical access control information and the identifier of the data objects matches the data object identifier indicated in the accessed piece of analytical access control information.

Receiving the transactional access control information may include receiving user identifiers and business object identifiers corresponding to records from the received transactional access control information. Receiving the transactional access control information may include receiving indications of permitted actions corresponding to the records from the received transactional access control information.

The received transactional access control information may be stored in an operational data store prior to translating the received transactional access control information, and accessed from the operational data store in order to translate the transactional access control information.

In another general aspect, a computer system for managing access control information for software operating on the computer system includes a data repository that stores access control information for software. The data repository includes user information identifying a user characteristic for at least one entry in the user information and data object information identifying a data object characteristic for at least one entry in the data object information. The computer system also includes an executable software module that causes transfer of access control information from a computer system that has generated the access control information. The executable software module also causes translation of the transferred access control information for use in determining whether a user that is associated with an entry in the user information is permitted to access a data object that is associated with an entry in the data object information. When the user characteristic and the data object characteristic correspond to a shared characteristic identified in the translated access control information, the user is permitted to access the data object.

Implementations may include one or more of the following features. For example, the computer system may include a second executable software module that uses the translated access control information to determine whether a user associated with an entry in the user information is permitted to access a data object associated with an entry in the data object information. The second executable software module may be part of, or separate from, the first executable software module.

The executable software module may cause the transfer of access control information that indicates that the user is permitted to access a data object when the user characteristic corresponds to a shared characteristic identified in the access control information to be transferred and the data object characteristic corresponds to a shared characteristic identified in the access control information to be transferred. The executable software module may translate the transferred access control information to produce translated access control information.

The executable software module may cause the transfer of access control information and the translation of the transferred access control information when the access control information has changed. The executable software module may cause the transfer of only the changed access control information.

Implementations of the techniques discussed above may include a method or process, a system or apparatus, or computer software on a computer-accessible medium.

The details of one or more of the implementations are set forth in the accompanying drawings and description below. Other features will be apparent from the description and drawings, and from the claims.

DESCRIPTION OF DRAWINGS

FIGS. 5A and 5B are block diagrams of representations of example user access control information.

DETAILED DESCRIPTION

User access control information to be used by multiple computer systems is managed at one of the multiple computer systems. The other computer systems extract necessary user access control information from the computer system on which the user access control information is managed. The other computer systems translate the extracted user access control information into a form that may be used by the other computer systems. The user access control information may correspond to data that is stored on the other computer systems or to users of the other computer systems. Managing the user access control information on one of the computer systems and transferring the managed information to the other computer systems simplifies the management of the user access control information. For example, in one implementation, the access control information is only managed once, and changes to the user access control information are propagated to the other computer systems when the other computer systems extract the changed user access control information.

Figure 1:
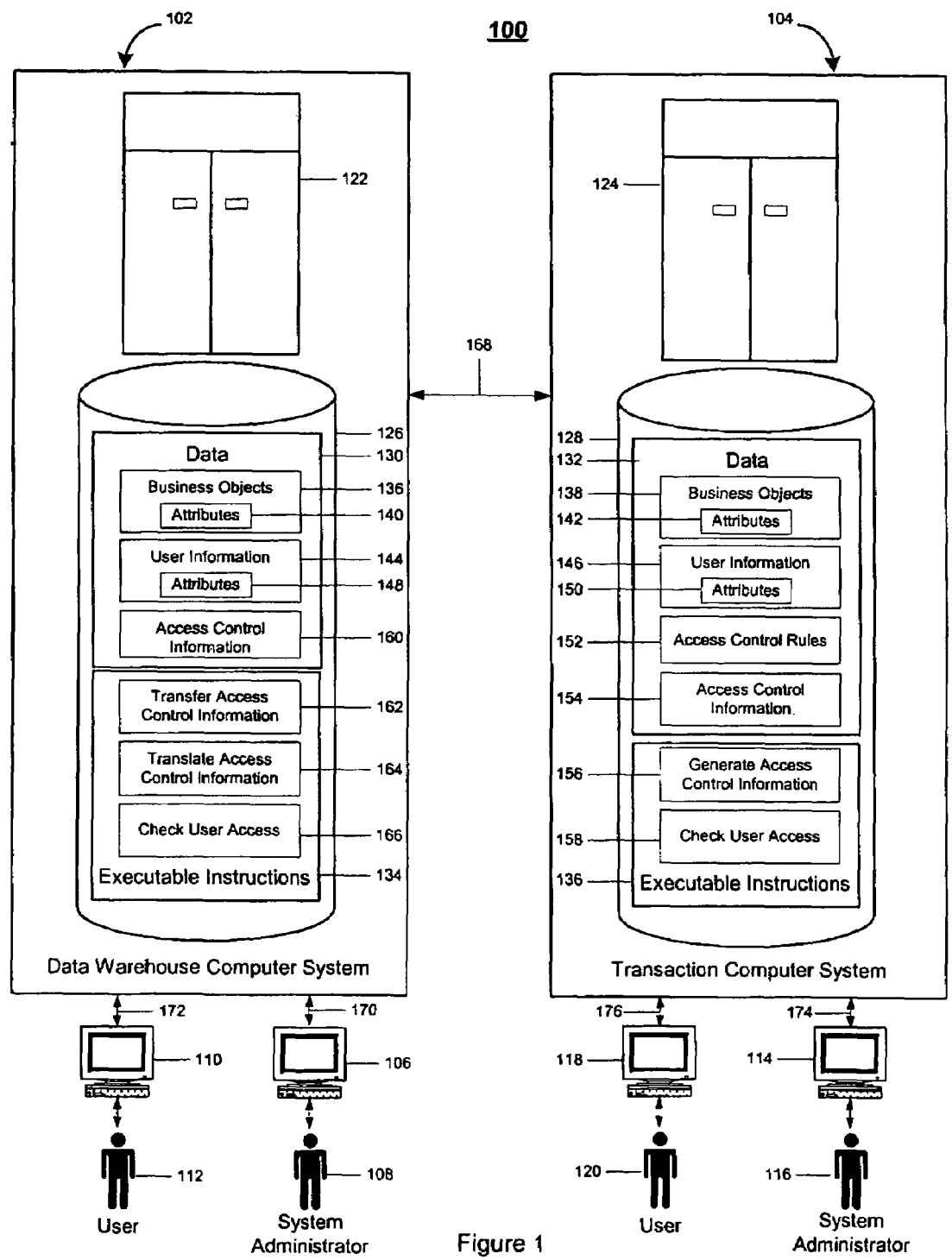
FIG. 1 is a block diagram of a system for managing user access control information.

FIG. 1 shows a block diagram of a system 100 of networked computers, including a data warehouse computer system 102 and a transaction computer system 104. Access control information is managed on the transaction computer system 104 and transferred to the data warehouse computer system 102 to govern how and by whom data on the data warehouse computer system 102 may be accessed. Users of the data warehouse computer system 102 and the transaction computer system 104 are only permitted access to a portion of data stored on the data warehouse computer system 102 and the transaction computer system 104, respectively. The portion of the data accessible to a user is based on a characteristic that is shared by the data and the user. The characteristic can be an attribute that is directly or indirectly related to the user and an attribute that is directly or indirectly related to the data.

The system 100 includes a client computer 106 used by a system administrator 108 to administer the data warehouse computer system 102, and a client computer 110 used by a user 112 to access the data warehouse computer system 102. The system 100 also includes a client computer 114 used by a system administrator 116 to administer the transaction computer system 104, and a client computer 118 used by a user 120 to access the transaction computer system 104. The data warehouse computer system 102, the transaction computer system 104, and the client computers 106, 110, 114 and 118 all are capable of executing instructions on data.

As is conventional, each of the computer systems 102 and 104 includes a server 122 or 124 and a data storage device 126 or 128 associated with the corresponding server 122 or 124. Each of the data storage devices 126 and 128 includes data 130 or 132 and executable instructions 134 or 136. The data 130 may be referred to as an analytical data store, and the data 132 may be referred to as a transactional data source. Particular portions of data, here referred to as business objects 136 or 138 and otherwise referred to as data objects, are stored in the computer systems 102 and 104, respectively. The business objects 136 and 138 each include multiple business objects. Each business object in business objects 136 or 138 is a collection of data attribute values, and typically is associated with a principal entity represented in a computing device or a computing system. Examples of business objects include information about a customer, an employee, a product, a business partner, a sales invoice, and a sales order. A business object may be stored as a row in a relational database table, an object instance in an object-oriented database, data in an extensible mark-up language (XML) file, or a record in a data file. Attributes 140 and 142 are associated directly or indirectly with the business objects 136 and 138, respectively. In one example, a customer business object may be associated with a series of attributes including a customer number uniquely identifying the customer, a first name, a last name, an electronic mail address, a mailing address, a daytime telephone number, an evening telephone number, a date of first purchase by the customer, a date of the most recent purchase by the customer, a birth date or age of the customer, and an income level of customer. In another example, a sales order business object may include a customer number of the purchaser, the date on which the sales order was placed, and a list of products, services, or both products and services purchased. The business objects 136 stored on the data warehouse computer system 102 is a central repository of data extracted from the transaction computer system 104, such as data included in the business objects 138.

The computer systems 102 and 104 also each store, respectively, user information 144 and 146, which is another particular portion of data. Like the business objects 136 and 138, each of the user information 144 and 146 includes multiple user objects. Attributes 148 and 150 are associated with a portion of, respectively, the user information 144 or 146. Each portion of the user information 144 and 146 is a collection of data attribute values associated with a particular user of the data warehouse computer system 102 or the transaction computer system 104. Typically, a portion of the user information 144 or 146 is directly or indirectly associated with some of the attributes 148 or 150. One type of attribute is a user identifier that uniquely identifies a particular user. Another type of attribute associated with the user, for example, may be an organizational unit to which the user is assigned, the sales territory for which the user is responsible, or the name of the user. The user information may be stored as rows in a relational database table, objects in an object-oriented database, data in an extensible mark-up language (XML) file, or records in a data file.

The transaction computer system 104 also stores access control rules 152 for generating access control information 154, which may be referred to as transactional access control information 154. The transaction computer system 104 includes a process 156 for generating access control information 154 and a process 158 to check, using the access control information 154, whether a particular user is permitted access to a particular business object. The process 156 includes executable instructions for automatically generating, based on a characteristic that is shared by a user and a business object, access control information 154 using access control rules 152. In general, the process 156 uses the access control rules 152, attributes 142 of business objects 138, and attributes 150 of user information 146 to generate access control information 154 that identifies the particular users that are permitted to access particular business objects. The process 158 includes executable instructions for determining, based on the generated access control information 154, whether a particular user is permitted access to a particular business object. The process 158 may be used by one or more transactional application programs running on the transaction computer system 104 to control access of the user 120 to the business objects 138 with the transactional application programs.

The data warehouse computer system 102 also stores access control information 160, which may be referred to as analytical access control information 160. The access control information 160 represents portions of the access control information 154 that have been transferred to the data warehouse computer system 102 from the transaction computer system 104. The data warehouse computer system 102 includes a process 162 for transferring access control information from the transaction computer system 104 to the data warehouse computer system 102, a process 164 for translating the transferred access control information, and a process 166 to check, using the access control information 160, whether a particular user is permitted to access a particular business object. The process 162 includes executable instructions for identifying access control information to be transferred and for transferring the identified access control information to the data warehouse computer system 102, as described more fully below. The process 164 includes executable instructions for translating the transferred access control information to produce the access control information 160 in a format that may be used by the data warehouse system 102, as described more fully below. The process 166 includes executable instructions for determining, based on the access control information 160, whether a particular user is permitted access to a particular business object. The process 166 may be used by one or more analytical application programs used for analytical processing on the data warehouse computer system 102 to control access of the user 112 to the business objects 136 with the analytical application programs.

The data warehouse computer system 102, the transaction computer system 104, and the client computers 106, 110, 114, and 118 may be arranged to operate within or in concert with one or more other systems, such as, for example, one or more local area networks (LANs) and/or one or more wide area networks (WANs). Each of the client computers 106 and 110 may be a general-purpose computer that is capable of operating as a client of the data warehouse computer system 102 (e.g., a desktop personal computer, a workstation, or a laptop computer running an application program). Similarly, each of the client computers 114 and 118 may be a general-purpose computer that is capable of operating as a client of the transaction computer system 104. Alternatively, the client computers 106, 110, 114, and 118 may be more special purpose computers (e.g., a device specifically programmed to operate as a client of the data warehouse computer system 102 or the transaction computer system 104).

The data warehouse computer system 102 is capable of delivering and exchanging data with the transaction computer system 104 through a wired or wireless communications pathway 168. The client computers 106 and 110 use wired or wireless communication pathways 170 and 172 to communicate with the data warehouse computer system 102. Similarly, the client computers 114 and 118 use wired or wireless communication pathways 174 and 176 to communicate with the transaction computer system 104.

In general, the access control information 160 is created as a result of translating access control information 154 that is transferred from the transaction computer system 104 to the data warehouse computer system 102. This may be accomplished, for example, through use of a task scheduler (not shown) that initiates the process 162 and the process 164 at a particular day and time. The process 162 and the process 164 may be scheduled as recurring events based on the occurrence of a predetermined time or date (such as each night or every Saturday at 1:00 A.M.).

The ability to automatically translate access control information that has been transferred from the transaction computer system 104 into a form that may be used by the data warehouse computer system 102 may be useful. This may be particularly true in a business enterprise that has a large number of computer systems across which access control information must be replicated and maintained. It may be more useful when the business enterprise has a large number users (e.g., thousands, or tens of thousands, of user) and/or a large number of business objects (e.g., millions of business objects) to which a user needs to be granted permission in order to access particular business objects. The burden of replicating and maintaining consistency of the access control information across the large number of computer systems may be so large in some cases as to prohibit the ability of a business enterprise to adequately restrict user access to data.

Figure 2:
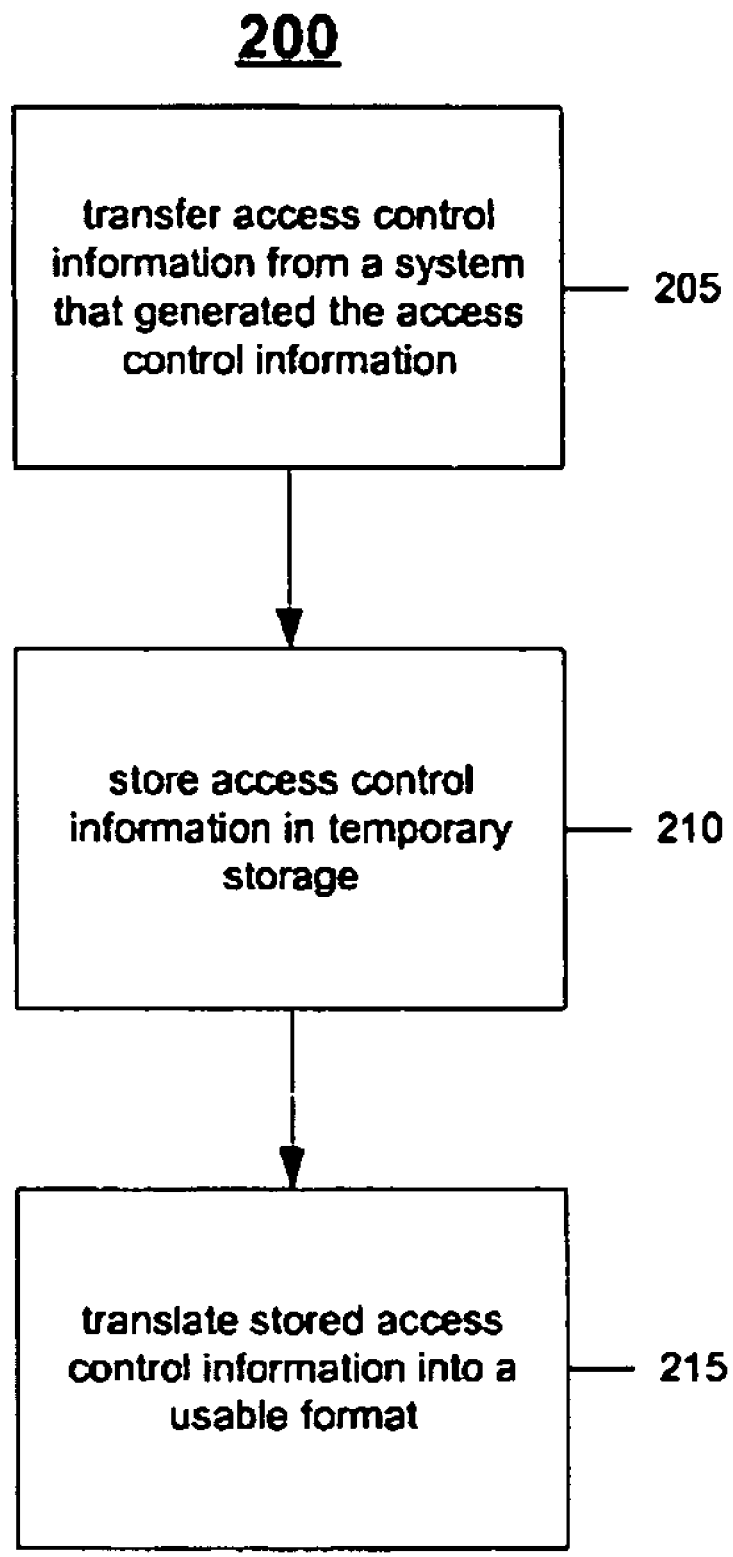
FIG. 2 is a flow chart of a process for managing user access control information.

FIG. 2 is a flow chart of a process 200 for translating access control information that has been transferred from a computer system on which the access control information was created into a format that may be used by a computer system to which the access control information has been transferred. In one implementation, the first computer system is a transaction computer system, such as the transaction computer system 104 of FIG. 1, and the second computer is a data warehouse computer system, such as the data warehouse computer system 102 of FIG. 1. The process 200 may be executed by the second computer system or any other computer system that requires access control information. The process 200 may be one implementation of the processes 162 and 164 of FIG. 1.

The process 200 begins when access control information is transferred from a first computer system that generated the access control information to a second computer system that requires the access control information (step 205). The first computer system generates the access control information based on access control rules. In one implementation, all of the access control information generated by the transaction computer system is transferred to the second computer system. In another implementation, only access control information that is needed by the second computer system is transferred to the second computer system. For example, only access control information relating to users of the second computer system may be transferred to the second computer system. As another example, only access control information relating to data stored on the second computer system may be transferred to the second computer system.

After being transferred from the first computer system, the access control information is stored in temporary storage on the second computer system (step 210). The access control information is held in the temporary storage before the access control information is processed further. More particularly, the stored access control information is accessed and translated into a format that may be used by the second computer system (step 215). For example, the stored access control information may be translated to create access profiles for users of the second computer system, with the access profiles specifying what data on the second system may be accessed by the users. After the stored access control information has been translated, the stored access control information may be deleted from the temporary storage on the data warehouse computer system.

Figure 3:
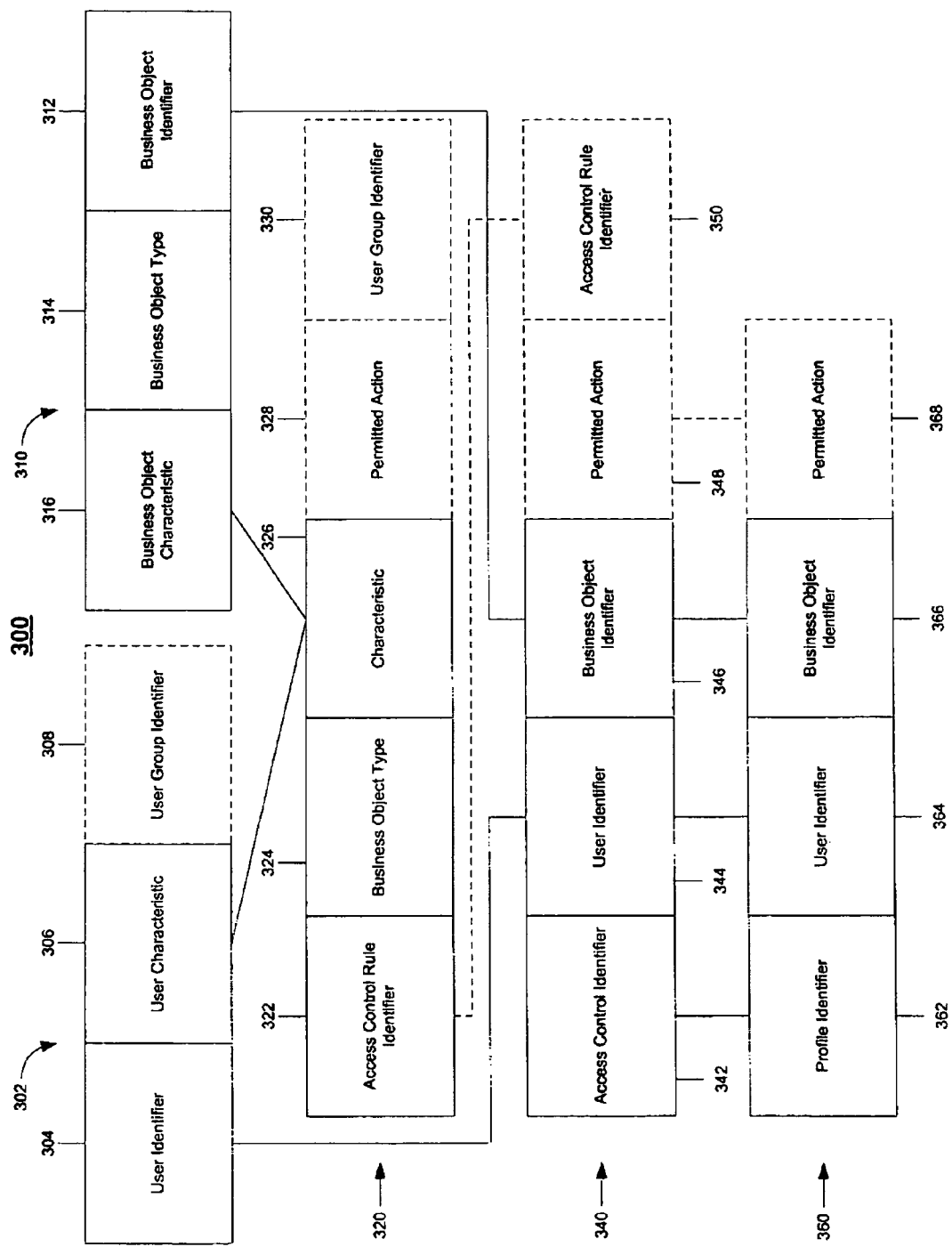
FIG. 3 is a block diagram illustrating example data structures for use in managing user access control information.

FIG. 3 shows an example of a data structure 300 that can be used to translate access control information received from a system that generates the access control information and to use the translated access control information to determine whether a particular user is permitted to access a particular business object. The data structure includes user information 302 that may be an implementation of the user information 144 or 146 of FIG. 1. The user information 302 includes a user identifier 304 that uniquely identifies information associated with a particular user, a user characteristic 306 and, optionally, a user group identifier 308. The user characteristic 306 includes one or more attributes associated with the user. For example, the user characteristic 306 may be a unique identifier of an organizational unit, such as a department, to which the user is assigned or may be a unique identifier of a geographic territory, such as a sales territory, over which the user is responsible. The optional user group identifier 308 uniquely identifies a particular user group to which the user is assigned. A user group is a collection of users that share a common characteristic or attribute. For example, a user group "managers" may be associated with a user who is a manager while a user group "sales employees" is associated with a user who is a sales employee.

The data structure 300 also includes business object information 310 that may be, for example, an implementation of the business information 136 or 138 of FIG. 1. The business object information 310 includes a business object identifier 312 that uniquely identifies information associated with a particular business object, a business object type 314 and a business object characteristic 316. The business object type 314 identifies a group of business objects of a particular type, such as sales orders, employees, or product information. The business object characteristic 316 includes one or more attributes associated with the business object. For example, the business object characteristic 316 may be a unique identifier of an organizational unit (such as a department) or a geographic location (such as the geographic area in which a sale occurred) with which the business object is associated.

The data structure 300 also includes access control rule information 320 that may be, for example, an implementation of access control rules 152 in FIG. 1. The access control rule information 320 includes an access control rule identifier 322 that uniquely identifies A particular access control rule, a business object type 324 that identifies a business object type to which the rule applies, a characteristic 326, an optional permitted action 328, and an optional user group identifier 330.

The characteristic 326 identifies the characteristic that the user and the business object each must have for the user to be permitted to access the business object. In one example, the characteristic 326 may be a particular organizational unit. When the user characteristic 306 of a particular user and the business object characteristic 316 both correspond to the characteristic 326 of the access control rule information 320, the user is permitted to access the particular business object. The characteristic 326 may be an attribute, an attribute and a corresponding attribute value, or a method of determining whether the user and the business object both have a characteristic. When only an attribute is identified in the characteristic 326, the value of the attribute associated with the user must correspond to the value of the attribute associated with business object. The ability to identify a characteristic as an attribute (rather than an attribute and a particular value that the attribute must have) may help reduce the amount of system administration required to define access control rules. For example, a system administrator may only need to identify a particular attribute (such as an organizational unit or a sales territory) rather than identifying separate rules for each value for the attribute. Thus, a system administrator may identify a single rule having an attribute for an organizational unit (or sales territory) attribute, rather than defining many rules, each of which identifies a particular value of the organizational unit (or sales territory).

The optional list of permitted actions 328 identifies the action or actions that a user may perform on the business object. Permitted actions may be one or more of a type of database operation (such as read, write, or delete) or may be another type of action, such as copying the business object. In some implementations, enabling a user to perform a particular action on the business object may enable the user to perform other more restricted actions on the business object. For example, if the user is given write access to modify the business object, then the user may be implicitly given read access to view the business object. In other implementations, enabling a user to perform a particular action on the business object does not imply that the user is consequently enabled to perform other more restricted actions on the business object. In such a case, if the user is given write access to modify the business object, then the user is not implicitly given read access and is only permitted read access to the business object when read access is explicitly given.

The user group identifier 330 optionally identifies the user group to which a user must belong to receive access to the business object. The optional user group identifier 330 may be used to provide a filter condition that reduces the amount of user information 302 processed to generate access control information. This may be accomplished, for example, when access control information is only generated for a subset of the user information that belongs to the user group identified by the user group identifier 330. This capability may be particularly useful in a computer system that includes a large number of users.

The data structure 300 also includes access control information 340 that may be, for example, an implementation of the access control information 154 of FIG. 1. The access control information 340 includes a record for each user that is permitted to access a particular business object. The access control information 340 includes an access control identifier 342, a user identifier 344, a business object identifier 346, an optional indication of permitted action 348, and an optional access control rule identifier 350. The access control identifier 342 uniquely identifies a particular access control record, and the user identifier 344 identifies a user that is permitted to access the business object identified by the business object identifier 346. The access control information 340 optionally includes an indication of the permitted actions 348 that the user is allowed to perform on the business object.

The access control information 340 also optionally includes an access control rule identifier 350 that identifies the access control rule used to generate the particular record in the access control information 340. By storing the access control rule identifier 350 in the access control information 340, the capability is provided to identify the particular access control rule used to generate the record of access control information. The capability (which may be referred to as traceability) may enable the selective creation or update of access control information when an access control rule is modified or deleted. This may be particularly useful when a computer system includes a large number of users, a large volume of data, or both a large number of users and a large volume of data.

When the access control rule information 320 includes an indication of permitted actions 328, an access rule identifier 350 for a particular access control information record may be able to identify permitted action from the access control rule information 320 even when the list of permitted actions 348 are not included in the access control information 340. This may be accomplished by identifying the indication of permitted action 328 in the access control rule based on the access control rule identifier 350 in the access control information 340.

In some implementations, the indication of permitted actions 328 in the access control rule information 320 and the indication of permitted actions 348 in the access control information 340 may correspond even when the permitted actions are represented in a different manner. For example, the access control rule information 320 may include an indication of permitted actions 328 that are more easily understood by a system administrator (who is responsible for creating and updating the access control rules) than the indication of permitted actions 348 in access control information 340 that may be represented as permitted data operations. For example, the indication of permitted action 328 in access control rule information 320 may include options of view, modify and archive that are easily understood by a system administrator defining an access rule, whereas the indication of permitted action 348 in the access control information 340 may include options of read, write and delete that correspond to database operations. In such a case, for example, the view option may correspond to the read operation; the modify option may correspond to the read operation and write operation; and the archive option may correspond to the read operation, write operation, and delete operation.

The data structure 300 also includes access control information 360 that may be, for example, an implementation of the access control information 160 of FIG. 1. The access control information 360 includes a record for each user that is permitted to access a particular business object. The access control information 360 corresponds to an access profile for a user of a computer system that includes the access control information 360. The access control information 360 represents access control information that has been translated into a usable format after having been transferred to the computer system. The access control information 360 includes a profile identifier 362, a user identifier 364, a business object identifier 366, and an optional indication of a permitted action 368. The profile identifier 362, which may correspond uniquely to the access control identifier 342, identifies a particular access profile for the computer system, and the user identifier 364, which may correspond to the user identifier 344, identifies a user to which the access profile applies. More particularly, the user identifier 364 identifies a user that is permitted to access the business object identified by the business object identifier 366, which may correspond to the business object identifier 346, according to the access profile. The optional indication of permitted action 368, which may correspond to the indication of permitted action 348, identifies the actions that the user is permitted to perform on the business object.

The access control information 360 does not include an indication of the access control rule 320 upon which the access control information 360 is based. This provides additional security, as the access control rules may not be deduced by viewing the access control information 360 because only the user identifier 364 and the business object identifier 366 are used.

The characteristic 326 of the access control rule information 320 may identify ways for determining whether a user may access a business object instead of simply identifying a characteristic to be matched against the user characteristic 306 and the business object characteristic 316. For example, the characteristic 326 may identify a method that may be executed to determine whether a user may access a business object. The method may call for the execution of methods for identifying a characteristic of the user, identifying a characteristic of the business object, and using the identified characteristics to determine whether the user may access the business object. The methods executed in determining whether a user may access a business object may be scripts, modules, methods, computer programs or other types of executable instructions that indicate how to determine whether a user may access a business object. The use of a method enables the definition of more complex relationships between users and characteristics (and business objects and characteristics) than otherwise may be possible through the use of a characteristic alone. Use of a method to define a user characteristic and/or a business object characteristic is not required.

Figure 4:
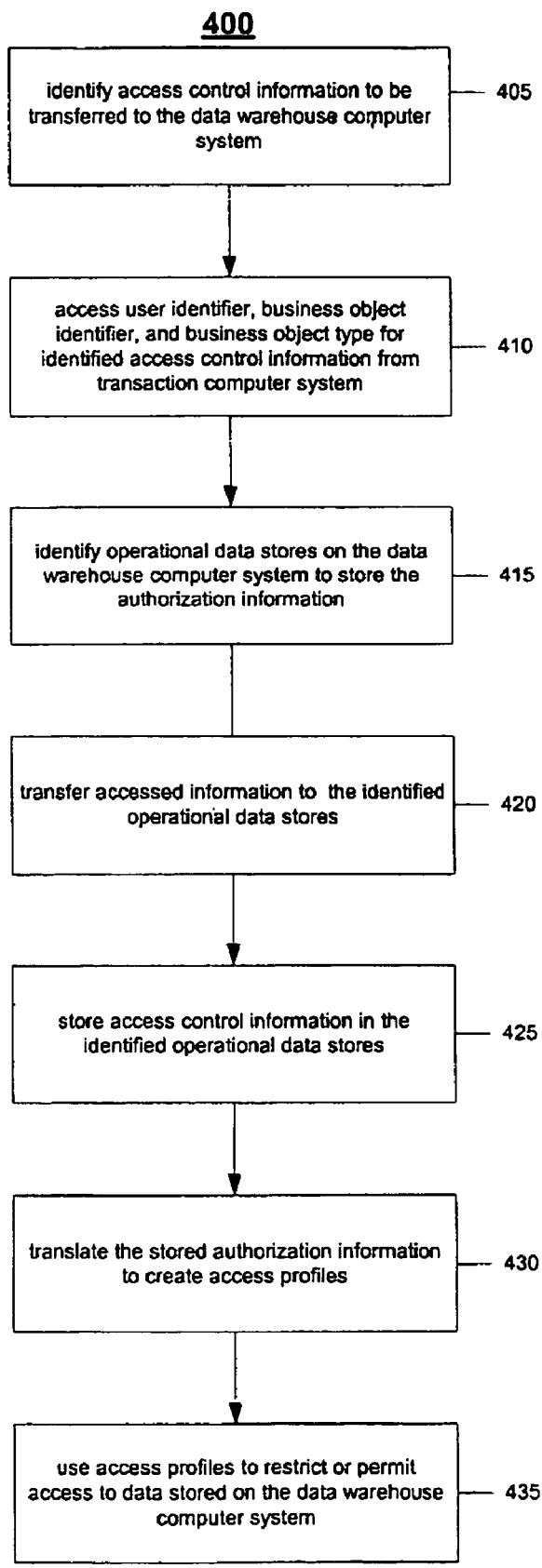
FIG. 4 is a flow chart of a process for managing user access control information for a data warehouse computer system.

FIG. 4 is a flow chart of a process 400 for translating access control information that was generated by a transaction computer system, such as the transaction computer system 104 of FIG. 1, after the access control information was transferred to a data warehouse computer system, such as the data warehouse computer system 102 of FIG. 1. The transaction computer system generates the access control information based on access control rules. The process 400 may be executed by the data warehouse system. More particularly, the process 200 may be one implementation of the processes 162 and 164 of FIG. 1.

The process 400 begins when the data warehouse computer system identifies access control information to be transferred to the data warehouse computer system (step 405). In one implementation, the data warehouse computer system simply may identify all access control information that has been generated by the transaction computer system for transfer to the data warehouse computer system. In other implementations, the data warehouse computer system may identify only a subset of the generated access control information. More particularly, the data warehouse computer system may identify only the generated access control information that is needed by the data warehouse computer system. For example, the data warehouse computer system may only identify the access control information that relates to users of the data warehouse computer system or to data that is stored on the data warehouse computer system.

The data warehouse computer system then accesses certain aspects of the identified access control information from the transaction computer system. More particularly, the data warehouse computer system accesses a user identifier, a business object identifier, and a business object type corresponding to each piece of the identified access control information (step 410). For example, with reference also to FIG. 3, the data warehouse may access the user identifier 344 and the business object 346 of identified access control information 340, and the accessed business object identifier may indicate the business object type. In addition, the data warehouse may access the permitted action 348 of the identified access control information 340, if such information is needed by the data warehouse computer system.

The data warehouse computer system then identifies operational data stores on the data warehouse computer system (step 415). The accessed aspects of the identified access control information are stored in the operational data stores. The operational data stores are used as a temporary holding location for the accessed aspects of the identified access control information after the accessed aspects have been transferred to the data warehouse computer system and before the accessed aspects are translated into a format that may be used by the data warehouse computer system. The data warehouse computer system then transfers the accessed access control information to the data warehouse computer system (step 420) and stores the accessed access control information in the identified operational data stores (step 425).

The data warehouse computer system then accesses the stored access control information from the operational data stores and translates the access control information into a format that may be used by the data warehouse computer system (step 430). In one implementation, the access control information is translated into access profiles that indicate what data may be accessed by the users of the data warehouse computer system on a per user basis. For example, an access profile for a particular user of the data warehouse computer system may identify the data that may be accessed by the particular user and the actions that the particular user may perform on the data.

The access profiles are then used to restrict or permit access to data stored on the data warehouse computer system (step 435). For example, a user may request access to a particular piece of data on the data warehouse computer system. The data warehouse computer system accesses the user profile for the requesting user and determines if access to the particular piece of data is permitted or restricted. Based on the determination, the data warehouse computer system enables or disables the requesting user from accessing the particular piece of data. Restricting or permitting access to data stored on the data warehouse computer system may include executing the process 166 of FIG. 1.

The process 400 may be executed by the data warehouse computer system on a periodic or aperiodic basis. For example, the process 400 may be executed daily or weekly. Alternatively, the process 400 may be executed each time a change to the access control information generated by the transaction computer system or to the access control rules used to generate the access control information is detected. In order to minimize the amount of access control information that is transferred between the transaction computer system and the data warehouse computer system, the data warehouse computer system may transfer and translate only the access control information that has changed. In one implementation, the transaction computer system may signal the data warehouse computer system that the access control information or the access control rules have changed and that the process 400 should be executed again. In another implementation, the data warehouse computer system may monitor the access control information and the access control rules of the transaction computer system and detect when changes have occurred.

Figure 5A:
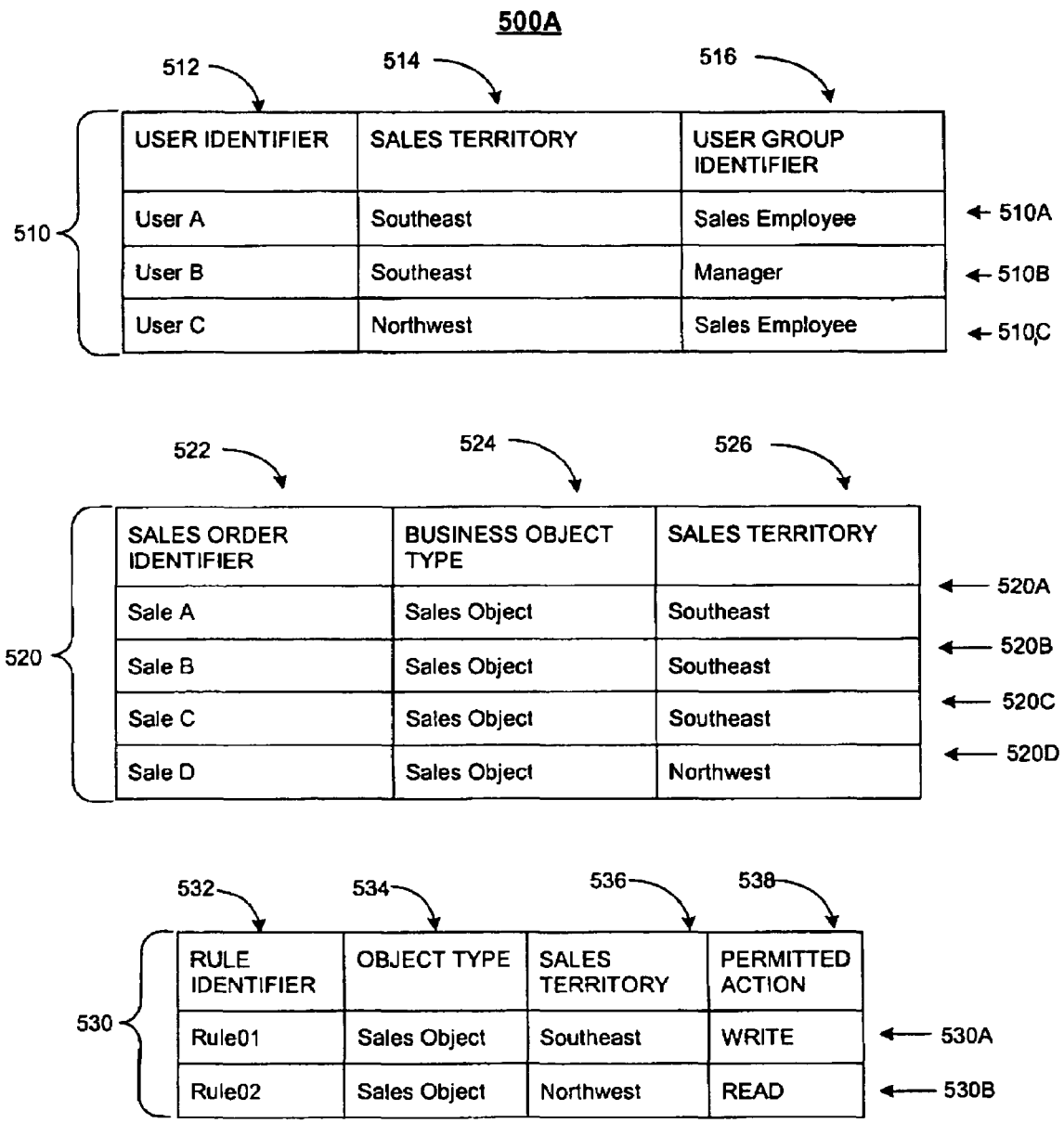

FIG. 5A represent a sample 500A of user information, business object information, and access control rules, and FIG. 5B represents a sample 500B of access control information that has been generated from the sample 500A. The sample 500B also includes access profiles that are a translated form of the generated access control information.

Referring to FIG. 5A, the sample 500A is stored in a relational database system that logically organizes data into database tables. The database tables arrange data associated with an entity (here, a user, a user assignment, or a sales order) in a table or tables. The sample 500A shows portions of a user table 510, a sales order table 520, and an access control rule table 530.

The user table 510 arranges data associated with a user into a series of columns 512, 514, and 516 and rows 510A-510C. Each of columns 512-516 describes an attribute of a user for which data is being stored. Each of rows 510A-510C represents a collection of attribute values for a particular user identifiable by a user identifier 512. The attributes include a sales territory 514 for which the particular user is responsible, and a user group identifier 516 that indicates a group to which a particular user belongs.

The sales order table 520 arranges data associated with a user assignment into a series of columns 522, 524, and 526 and rows 520A-520D. Each of columns 522-526 describes an attribute of a sales order for which data is being stored. Each of rows 520A-520D represents a collection of attribute values for a particular sales order identifiable by a sales order identifier 522. The attributes include a business object type 524 of a particular sales order and a sales territory 526 in which the particular sales order was placed, which may be called a characteristic of the sales order.

The access control rule table 520 arranges data associated with an access control rule into a series of columns 532, 534, 536, and 538 and rows 530A-530B. Each of columns 532-538 describes an attribute of a sales order for which data is being stored. Each of rows 530A-530B represents a collection of attribute values for a particular access control rule identifiable by a rule identifier 532. The attributes include an object type 534 to which a particular rule applies, a sales territory 536 to which the particular rule applies, and an action 538 permitted by the particular rule.

Referring to FIG. 5B, the sample 500B is stored in a relational database system that logically organizes data into database tables. The database tables arrange data associated with an entity (here, a user, a user assignment, or a sales order) in a table or tables. The sample 500A shows a portion of an access control information table 560 and an access profile table 580.

The access control information table 560 arranges data associated with access control information into a series of columns 561, 563, 565, 567, and 569 and rows 560A-560G.

Each of columns 561-569 describes an attribute of a sales order for which data is being stored. Each of rows 560A-560G represents a collection of attribute values for a particular piece of access control information identifiable by an access control identifier 561. The attributes include an identifier 563 of a user to which the particular piece of access control information applies, an identifier 565 of a business object to which the particular piece of access control information applies, an action 567 that the user is allowed to perform on the business object according to the particular piece of access control information, and an identifier 569 of an access control rule that was used to generate the particular piece of access control information.

The access profile table 580 arranges data associated with an access profile into a series of columns 581, 583, 585, and 587 and rows 580A-580G. Each of columns 581-587 describes an attribute of an access profile for which data is being stored. Each of rows 580A-580G represents a collection of attribute values for a particular access profile identifiable by an access profile identifier 581. The attributes include an identifier 583 of a user to which the particular access profile applies, an identifier 565 of a business object to which the particular access profile applies, and an action 567 that the user is allowed to perform on the business object according to the particular access profile.

The information in the access control information table 560 is generated by applying the rules included in the access control rule table 530 to the information included in the user table 510 and the sales order table 520. For example, the rule 530A indicates that users corresponding to the southeast sales territory are permitted to modify sales orders corresponding to the southeast territory. As a result, the access control information pieces 560A-560F are created to allow the users 510A and 5101B read and write access to the sales orders 520A-520C. As another example, the rule 530B indicates that users corresponding to the northwest sales territory are permitted to read sales orders corresponding to the northwest territory. As a result, the access control information piece 530G is generated to allow the user 510C read access to the sales order 520D, since both the user 510c and the sales order 520D correspond to the northwest territory.

The information included in the access control information table 560 is originally stored on a first computer system on which the information is generated, such as the transaction computer system 104 of FIG. 1. A second computer system that requires the access control information, such as the data warehouse computer system 102 of FIG. 1, may transfer the information to the second computer system to produce the information included in the access profile information table 580, which is stored on the second computer system. Some or all of the information from the access control information table 560 may be transferred to the second computer system. As illustrated, all of the information from the access control information table 560 has been transferred to the second computer system. Alternatively, if the users 510A and 510C are users of the second computer system, only the access control information pieces 560A, 560C, 560E, and 560G may be transferred to the second computer system, because those access control information pieces 560A, 560C, 560E, and 560G are relevant to the operation of the second computer system. If the second computer system handles sales orders corresponding to the northwest sales territory, such as the sales order 520D, only the access control information piece 560G may be transferred to the second computer system because that access control information piece 560G corresponds to the northwest sales territory.

Once the access control information has been transferred to the second computer system, the second computer system translates the access control information into a format that may be used by the second computer system. For example, the second computer system may translate the transferred access control information into access profiles that indicate how particular users may access particular data on the second computer system. The access profiles 580A-580G are translations of the access control information pieces 560A-560G, respectively.

A data warehouse computer system is used throughout as an example of a system that requires access control information and that does not generate access control information. However, any computer system that requires access control information and that does not generate access control information may be used. In addition, a transaction computer system is used throughout as a system from which access control information may be transferred because the system generates access control information. However, access control information may be transferred from any system that generates access control information. Therefore, in some implementations, a data warehouse computer system may generate access control information based on access control rules, and a transaction computer system may transfer and translate the generated access control information.

Access control information that has been generated by a particular computer system may be transferred to and used on any number of other computer systems. In addition, a computer system may transfer access control information from multiple computer systems that generate access control information. In such a case, different sets of access control information received from different computer systems may indicate different levels of access to a data object for a user. In some implementations, the user may be given the broadest, least restrictive level of access to the data object on the computer system that is indicated by one of the sets of received access control information. In other implementations, the user may be given the narrowest, most restrictive level of access to the data object on the computer system that is indicated by one of the sets of received access control information. Additionally or alternatively, the computer system may provide a capability to a system administrator (or another type of user) of the computer system to resolve the difference between the different sets of received access control information for a user or group of users. The computer system also may enable the system administrator to configure when differences are resolved by providing the broadest indicated level of access, by providing the narrowest indicated level of access, or by enabling the system administrator to manually resolve the differences.

In addition, access control information may be transferred from any system that includes the access control information. In other words, access control information that is transferred need not be generated by a system from which the access control information is transferred. For example, a first data warehouse computer system may transfer and translate access control information from a transaction computer system that generated the access control information according to access control rules. A second data warehouse computer system may transfer the access control information from the first data warehouse computer system, which did not generate the access control information. Because the first and second data warehouse computer systems are both data warehouse computer systems, the second data warehouse computer system may not need to translate the transferred access control information and may be able to directly use the transferred access control information.

The techniques described above can be implemented in digital electronic circuitry, or in computer hardware, firmware, software, or in combinations of them. They can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The described techniques can be performed by one or more programmable processors executing a computer program to perform the techniques by operating on input data and generating output. Method steps can also be performed by, and the systems described above can be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM (erasable programmable read-only memory), EEPROM (electrically erasable programmable read-only memory), and flash memory devices; magnetic disks, e.g., internal hard disks or removable disks; magneto-optical disks; and CD-ROM (compact disk read-only memory) and DVD-ROM (digital versatile disk read-only memory) disks. The processor and the memory can be supplemented by, or incorporated in special purpose logic circuitry.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer program product tangibly embodied in a machine-readable storage device, the computer program product including instructions that, when executed, cause a user access control component to perform operations comprising:
   receiving, at an analytical application program used for analytical processing, transactional access control information extracted from a transactional data source used by a transactional application program, wherein each entry in the transactional access control information identifies a user that is permitted to access a data object that is stored in the transactional data source;
   translating the received transactional access control information into analytical access control information for use by the analytical application program, wherein entries in the analytical access control information identify users that are able to access data objects that i) are stored in an analytical data store used by the analytical application program and ii) correspond to data objects stored in the transactional data source; and
   using the analytical access control information to permit or restrict access to data objects that are stored in the analytical data store used by the analytical application program.

2. The computer program product of claim 1 wherein the instructions that, when executed, further cause the user access control component to:
   determine whether a data object stored in the transactional data source has a corresponding data object stored in the analytical data store;
   extract transactional access control information from the transactional data source wherein transactional access control information is only extracted for data objects stored in the transactional data source and that have corresponding data objects stored in the analytical data store; and
   provide the extracted transactional access control information to the analytical application program.

3. The computer program product of claim 2 wherein determining whether a data object stored in the transactional data source has a corresponding data object stored in the analytical data store comprises determining whether an identifier of a data object in the data source corresponds to an identifier of a data object in the analytical data source.

4. The computer program product of claim 1 wherein the instructions that, when executed, further cause the user access control component to:
   extract transactional access control information from the transactional data source, wherein only transactional access control information is extracted for users authorized to use the transactional application program when the users also are authorized to use the analytical application program; and
   provide the extracted transactional access control information to the analytical application program.

5. The computer program product of claim 1 wherein the instructions that, when executed, further cause the user access control component to:
   receive an indication that the transactional access control information that is received has changed;
   identify the transactional access control information that has changed;
   receive only the changed transactional access control information at the analytical application program; and
   translate the changed access control information into analytical access control information.

6. The computer program product of claim 1 wherein using the analytical access control information comprises:
   accessing a record from the analytical access control information;
   determining whether an identifier of a user requesting access to the data objects matches a user identifier indicated in the accessed record from the analytical access control information;
   determining whether an identifier of the data objects to which the user has requested access matches a data object identifier indicated in the accessed piece of analytical access control information; and enabling the user to access the data objects in a manner indicated in the accessed piece of analytical control information when the identifier of the user matches the user identifier indicated in the accessed piece of analytical access control information and the identifier of the data objects matches the data object identifier indicated in the accessed piece of analytical access control information.

7. The computer program product of claim 1 wherein receiving the transactional access control information comprises receiving user identifiers and business object identifiers corresponding to records from the received transactional access control information.

8. The computer program product of claim 7 wherein receiving the transactional access control information comprises receiving indications of permitted actions corresponding to the records from the received transactional access control information.

9. The computer program product of claim 1 wherein the instructions that, when executed, further cause the user access control component to:

store the received transactional access control information in an operational data store prior to translating the received transactional access control information; and access the received transactional access control information in order to translate the transactional access control information.

10. A computer-implemented method for managing user access control information, the method comprising:

receiving, at an analytical application program used for analytical processing, transactional access control information extracted from a transactional data source used by a transactional application program, wherein each entry in the transactional access control information identifies a user that is permitted to access a data object that is stored in the transactional data source;

translating the received transactional access control information into analytical access control information for use by the analytical application program, wherein entries in the analytical access control information identify users that are able to access data objects that i) are stored in an analytical data store used by the analytical application program and ii) correspond to data objects stored in the transactional data source; and using the analytical access control information to permit or restrict access to data objects that are stored in the analytical data store used by the analytical application program.

11. The method of claim 10 further comprising:

determining whether a data object stored in the transactional data source has a corresponding data object stored in the analytical data store;

extracting transactional access control information from the transactional data source wherein transactional access control information is only extracted for data objects stored in the transactional data source and that have corresponding data objects stored in the analytical data store; and providing the extracted transactional access control information to the analytical application program.

12. The method of claim 11 wherein determining whether a data object stored in the transactional data source has a corresponding data object stored in the analytical data store comprises determining whether an identifier of a data object in the data source corresponds to an identifier of a data object in the analytical data source.

13. The method of claim 10 further comprising:

extracting transactional access control information from the transactional data source, wherein only transactional access control information is extracted for users authorized to use the transactional application program when the users also are authorized to use the analytical application program; and providing the extracted transactional access control information to the analytical application program.

14. The method of claim 10 further comprising:

receiving an indication that the transactional access control information that is received has changed;

identifying the transactional access control information that has changed;

receiving only the changed transactional access control information at the analytical application program; and translating the changed access control information into analytical access control information.

15. The method of claim 10 wherein using the analytical access control information comprises:

accessing a record from the analytical access control information;

determining whether an identifier of a user requesting access to the data objects matches a user identifier indicated in the accessed piece of analytical access control information;

determining whether an identifier of the data objects to which the user has requested access matches a data object identifier indicated in the accessed piece of analytical access control information;

enabling the user to access the data objects in manner indicated in the accessed piece of analytical control information when the identifier of the user matches the user identifier indicated in the accessed piece of analytical access control information and the identifier of the data objects matches the data object identifier indicated in the accessed piece of analytical access control information.

16. The method of claim 10 wherein receiving the transactional access control information comprises receiving user identifiers and data object identifiers corresponding to records from the received transactional access control information.

17. The method of claim 16 wherein receiving the transactional access control information comprises receiving indications of permitted actions corresponding to the records from the received transactional access control information.

18. The method of claim 10 further comprising:

storing the received transactional access control information in an operational data store prior to translating the received transactional access control information; and accessing the received transactional access control information in order to translate the transactional access control information.

* * * * *